(12) United States Patent
Kuenzi et al.

(10) Patent No.: US 11,516,664 B2
(45) Date of Patent: Nov. 29, 2022

(54) CREDENTIAL LICENSING SERVICE

(71) Applicant: Carrier Corporation, Palm Beach Gardens, FL (US)

(72) Inventors: Adam Kuenzi, Silverton, OR (US); Jonah J. Harkema, Newberg, OR (US); Yenong Qi, Salem, OR (US); Sean Deng, Salem, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 107 days.

(21) Appl. No.: 16/091,712

(22) PCT Filed: Mar. 17, 2017

(86) PCT No.: PCT/US2017/022890
§ 371 (c)(1),
(2) Date: Oct. 5, 2018

(87) PCT Pub. No.: WO2017/176437
PCT Pub. Date: Oct. 12, 2017

(65) Prior Publication Data
US 2019/0121946 A1    Apr. 25, 2019

Related U.S. Application Data

(60) Provisional application No. 62/318,350, filed on Apr. 5, 2016.

(51) Int. Cl.
*G06F 21/00* (2013.01)
*H04W 12/08* (2021.01)
*G06F 21/35* (2013.01)
*G06F 21/10* (2013.01)
*G06F 16/955* (2019.01)

(52) U.S. Cl.
CPC .......... *H04W 12/08* (2013.01); *G06F 16/955* (2019.01); *G06F 21/10* (2013.01); *G06F 21/105* (2013.01); *G06F 21/35* (2013.01)

(58) Field of Classification Search
CPC ...... G06F 21/105; G06F 16/955; G06F 21/10; G06F 21/35
See application file for complete search history.

(56) References Cited

U.S. PATENT DOCUMENTS

| 7,243,369 B2 | 7/2007 | Bhat et al. |
| 7,310,729 B2 | 12/2007 | Gordon et al. |
| 7,516,147 B2 | 4/2009 | Kranz et al. |

(Continued)

FOREIGN PATENT DOCUMENTS

| GB | 2526818 A | 12/2015 |
| WO | 2014/072187 A1 | 5/2014 |

OTHER PUBLICATIONS

International Search Report for PCT/US2017/022890 dated May 31, 2017.

*Primary Examiner* — Philip J Chea
*Assistant Examiner* — Rodman Alexander Mahmoudi
(74) *Attorney, Agent, or Firm* — Bachman & LaPointe, P.C.

(57) ABSTRACT

A system includes a credential service operable to store a URL for reaching the credential service and a mobile library on a mobile device operable to communicate with the credential service, the mobile library operable to receive the URL for subsequent transactions with the credential service.

20 Claims, 3 Drawing Sheets

(56) References Cited

U.S. PATENT DOCUMENTS

| | | | |
|---|---|---|---|
| 7,571,467 B1 | 8/2009 | Priestley et al. | |
| 7,979,457 B1* | 7/2011 | Garman | G06Q 30/0625 |
| | | | 707/768 |
| 8,606,234 B2 | 12/2013 | Pei et al. | |
| 8,776,169 B2 | 7/2014 | Rajagopal et al. | |
| 8,826,260 B2 | 9/2014 | Ran et al. | |
| 8,881,248 B2 | 11/2014 | Liu | |
| 9,122,858 B2 | 9/2015 | Dittrich et al. | |
| 2003/0217275 A1* | 11/2003 | Bentley | G06F 21/10 |
| | | | 713/184 |
| 2006/0095779 A9* | 5/2006 | Bhat | H04L 67/02 |
| | | | 713/182 |
| 2006/0259523 A1 | 11/2006 | Wallis et al. | |
| 2007/0150967 A1* | 6/2007 | Takahashi | G06Q 30/06 |
| | | | 726/31 |
| 2008/0066181 A1 | 3/2008 | Haveson et al. | |
| 2009/0157527 A1* | 6/2009 | Bhambri | G06Q 30/0601 |
| | | | 705/26.1 |
| 2010/0023412 A1* | 1/2010 | Kitagawa | G06Q 30/0601 |
| | | | 705/26.1 |
| 2010/0198687 A1* | 8/2010 | Bang | H04N 21/8355 |
| | | | 705/310 |
| 2011/0162062 A1* | 6/2011 | Kumar | H04L 63/0272 |
| | | | 726/15 |
| 2013/0061055 A1 | 3/2013 | Schibuk | |
| 2013/0167208 A1 | 6/2013 | Shi | |
| 2013/0198864 A1 | 8/2013 | Li et al. | |
| 2013/0204744 A1* | 8/2013 | Grass | G06Q 30/0609 |
| | | | 705/26.35 |
| 2013/0212661 A1 | 8/2013 | Neafsey et al. | |
| 2014/0012750 A1* | 1/2014 | Kuhn | H04W 4/60 |
| | | | 705/41 |
| 2015/0020178 A1 | 1/2015 | Grunin et al. | |
| 2015/0189081 A1* | 7/2015 | Gosselin | H04W 4/16 |
| | | | 455/415 |
| 2015/0199863 A1 | 7/2015 | Scoggins et al. | |
| 2015/0271179 A1* | 9/2015 | Wang | H04L 63/0846 |
| | | | 726/30 |
| 2016/0127330 A1* | 5/2016 | Roth | H04L 63/123 |
| | | | 713/168 |

* cited by examiner

CREDENTIAL LICENSING SERVICE

BACKGROUND

The present disclosure relates generally to access control systems, and more particularly, to a method of licensing a service by utilizing a URL to reach the service.

Software is developed by businesses who depend on revenues from the use of the software, so these businesses need control of the deployment and use of their software. An example is a mobile credential service that is hosted in a cloud or off-premise location and that can issue credentials to a mobile phone for opening a lock. In this example, the business creating the credential service software is interested in ensuring awareness of copies or duplications of the service to receive revenues for the use of the software.

Methods exist for licensing software in ways that control deployments or at least inform of deployments. Some existing methods for licensing a service include locking software to a particular machine using things like: file system volume identifiers, motherboard serial numbers, and IP addresses. The locking is done by matching an identifier in the license with the identifiers in the environment that the software is running in. With virtual machine (VM) environments, and in particular cloud-hosted environments, most or all of these machine unique identifiers can be copied or duplicated or are not available. So there is a need for a method of licensing software that does not depend upon specific machine attributes.

SUMMARY

A system according to one disclosed non-limiting embodiment of the present disclosure can include a service operable to store a URL for reaching the service; and an application on a mobile device operable to communicate with the service, the application operable to receive the URL for subsequent transactions with the service.

A further embodiment of the present disclosure may include a license for the service that when validated will validate that the URL in the license is the same as the URL in the service that is being sent to mobile application on the mobile device.

A further embodiment of the present disclosure may include a license that will validate that the URL in the license is the same as the URL in the credential service that is being sent to mobile device.

A license for a service according to another disclosed non-limiting embodiment of the present disclosure can include a URL for reaching the service, the service operable to store the URL.

A further embodiment of the present disclosure may include, wherein the URL in the license is the same as the URL stored in the service that is being sent to mobile application on the mobile device.

A further embodiment of the present disclosure may include, wherein the URL is redirectable.

A method of licensing software for a service, the method according to another disclosed non-limiting embodiment of the present disclosure can include downloading a URL for subsequent transactions with the service to a mobile device.

A further embodiment of the present disclosure may include using the URL to reach the service.

A further embodiment of the present disclosure may include checking the URL.

A further embodiment of the present disclosure may include, wherein checking the URL includes validating the license signature.

A further embodiment of the present disclosure may include, wherein checking the URL includes validating a lifespan of the license.

A further embodiment of the present disclosure may include, wherein validating a lifespan of the license includes validating a date.

A further embodiment of the present disclosure may include, wherein checking the URL includes making a call to another service that is separate from the credential service and sending a copy of the URL and an identifier of the service, then receiving back an indication of whether the license is still valid.

A further embodiment of the present disclosure may include comparing a copy of the URL with what is saved in the license.

A further embodiment of the present disclosure may include, wherein the comparing includes a direct string comparison.

A further embodiment of the present disclosure may include, wherein the comparing includes encrypting the URL into a resulting form that can be compared.

A further embodiment of the present disclosure may include, wherein the comparing includes hashing the URL into a resulting form that can be compared.

A further embodiment of the present disclosure may include preparing a response to the mobile device with requested credentials from the credential service.

A further embodiment of the present disclosure may include saving the information returned by the credential service and saving the copy of the URL.

A further embodiment of the present disclosure may include using the URL to reach the credential service.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
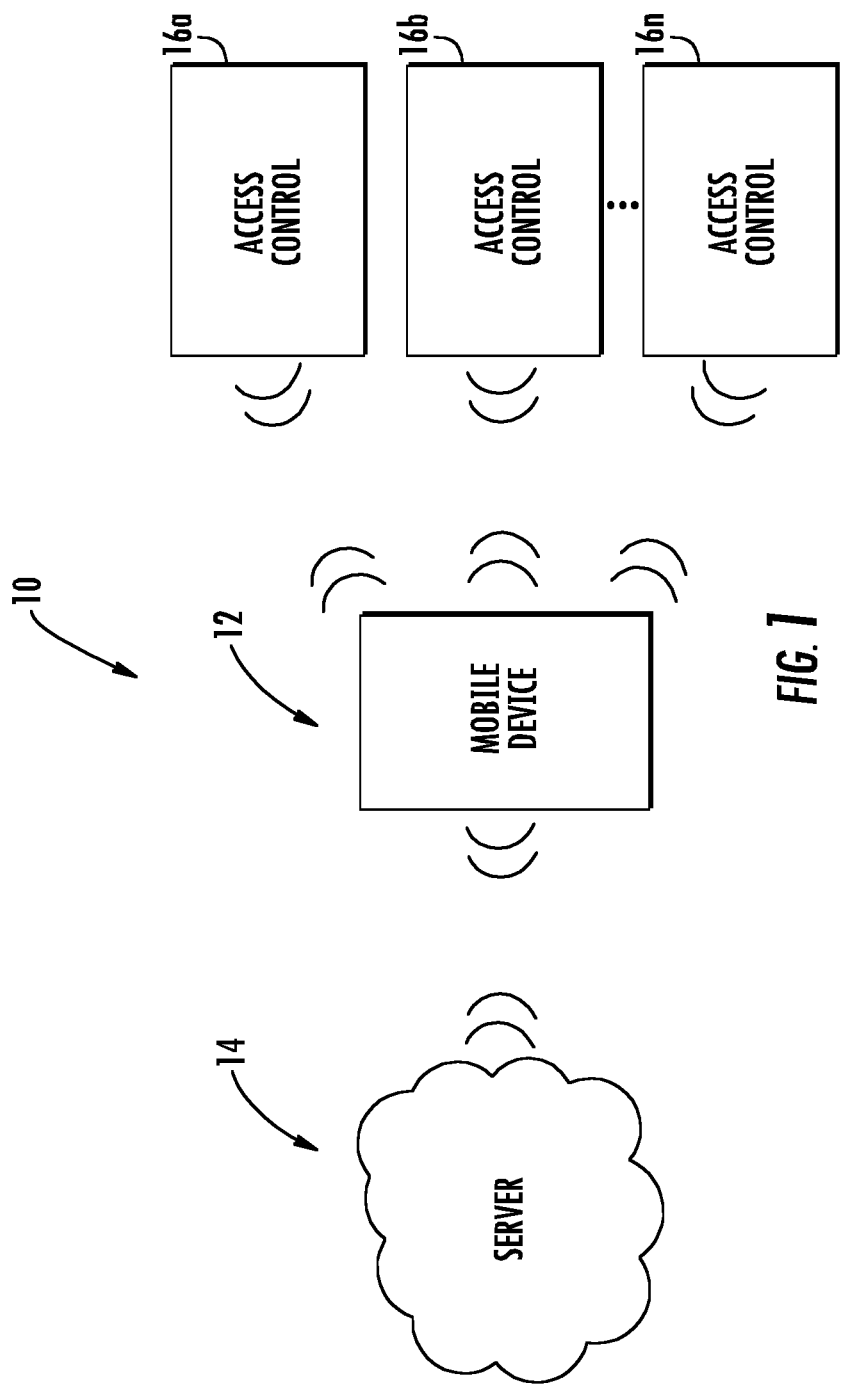
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, ..., 16n. It should be appreciated that, although particular systems are separately defined in the schematic block diagrams, each or any of the systems may be otherwise combined or separated via hardware and/or software.

The mobile device 12 is a wireless capable handheld device such as a smartphone that is operable to communicate with the server 14 and the access controls 16 via an application "app" that runs on the smartphone (also referred to herein as the mobile device 12). The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
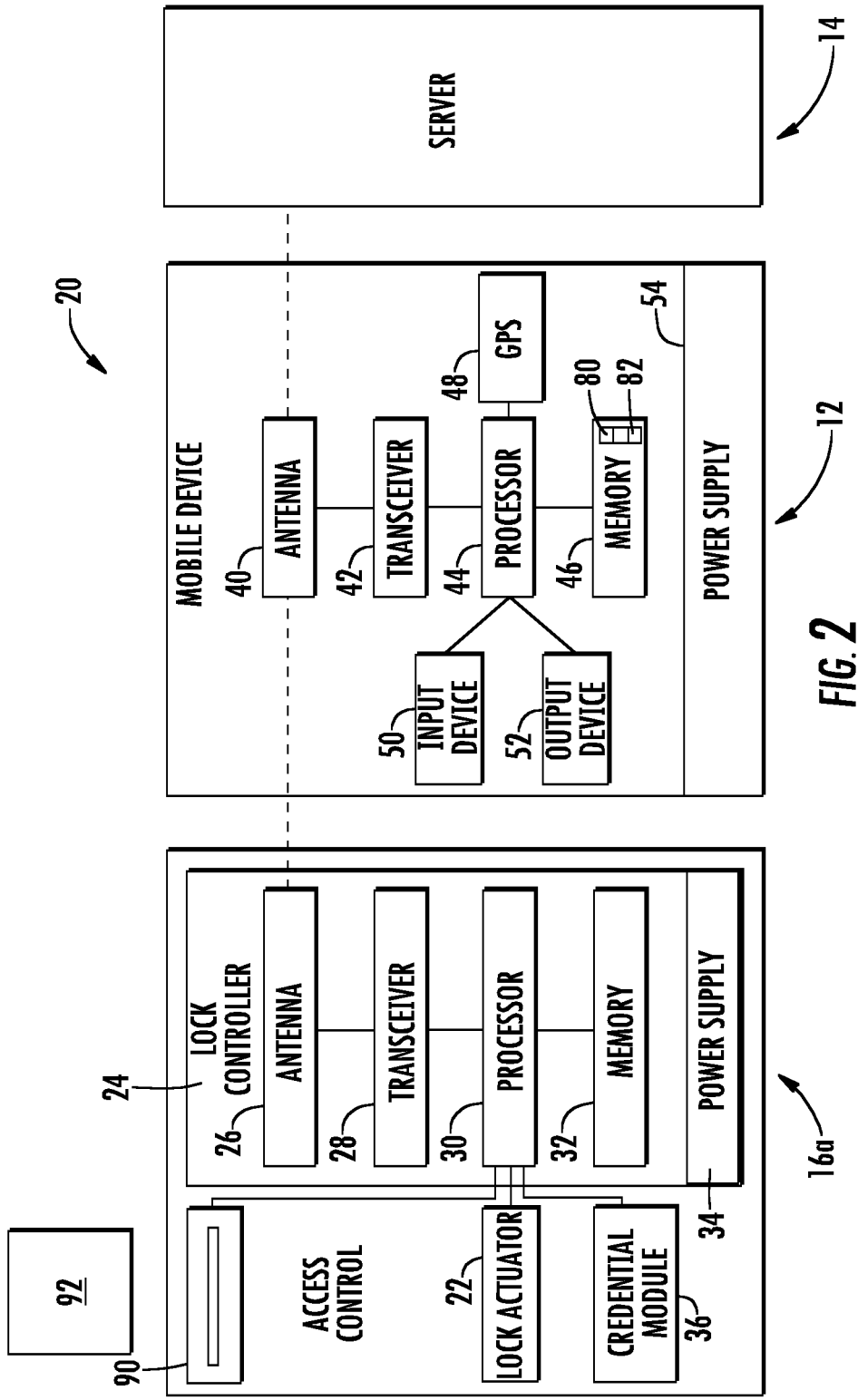
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12.

Figure 3:
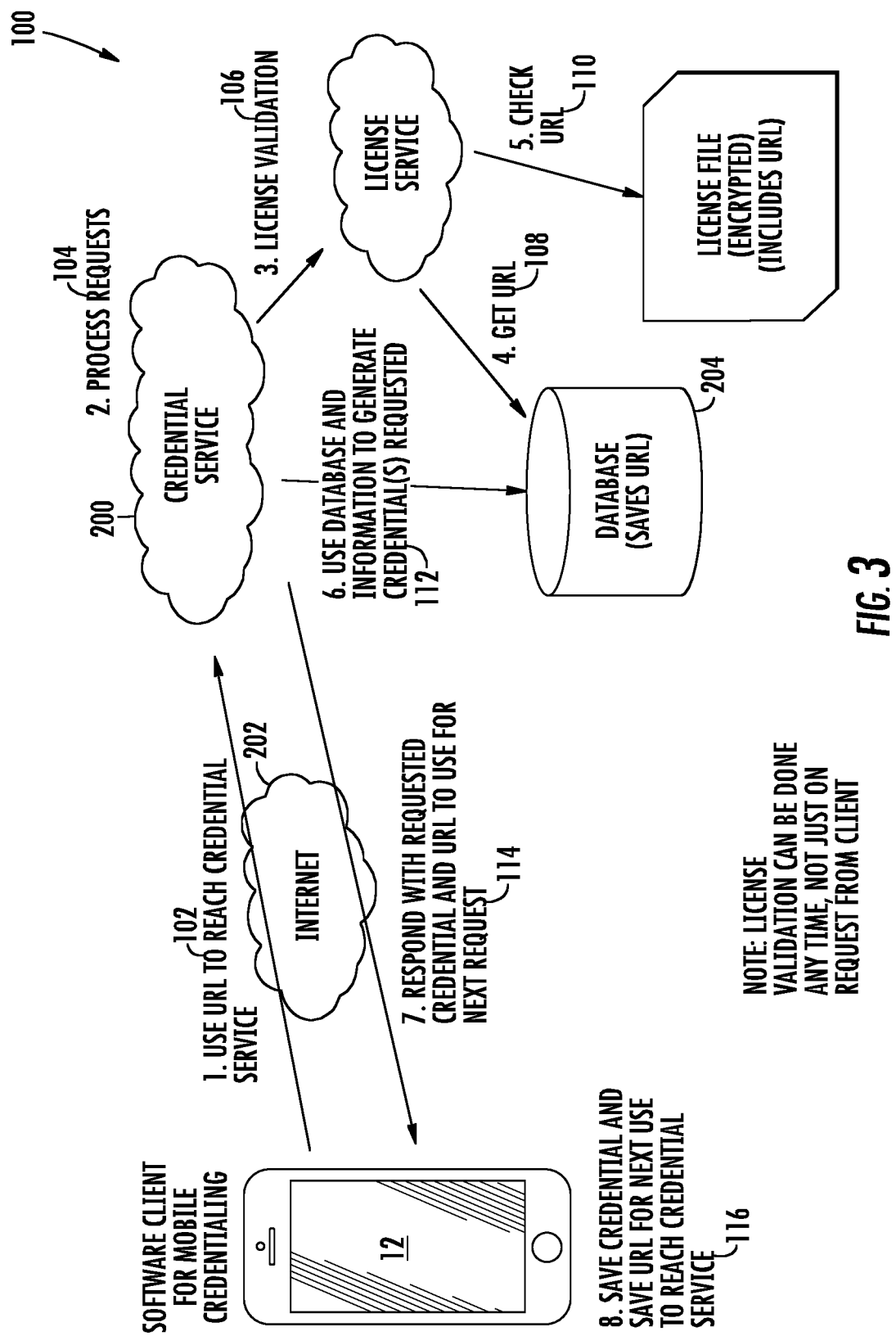
FIG. 3 is a flowchart of a credential management method performed by the user authentication system.

With reference to FIG. 3, a method 100 for licensing a service is disclosed in terms of functional block diagrams. It should be appreciated that these functions may be enacted in either dedicated hardware circuitry or programmed software routines capable of execution in various microprocessor based electronics control embodiments.

A service 200 alone provides limited benefit but has purpose, for example, when a mobile application on the mobile device 12 is used to communicate with the service 200 to download, for example, a credential. Thus, in this example, the credential service 200 must be used with mobile devices 12 that use the credential service 200. Generally, services 200 are hosted and available on the Internet 202. For example, with reference to all Figures, a mobile credentialing service 200 with a license service and database 204 may be part of the same server 14 that is reachable on the Internet. Or, they may be part of multiple separately installed server 14s. Or, the server 14 may optionally provide other services in addition to the mobile credentialing service 200 and these other services may depend upon the same license as the mobile credentialing service 200. In any case, to find the service 200, the mobile device 12 requires a domain name or URL to reach the credential service 200. Once the mobile device can communicate with the credential service, the service 200 can then download information to the mobile device 12.

The credential service 200 stores the URL for reaching the credential service, for example in a database 204, and sends this URL to the mobile device 12 to use in subsequent transactions. Changing the stored URL will 'point' or 'move' any mobile device 12 to a new URL location. This is useful, for example, for migrating accounts from one service 200 in a certain server 14 to another different service 200 in possibly a different server 14. But, if the URL sent to the mobile device 12 is incorrect, the mobile device 12 will fail to communicate with the credential service 200 on subsequent communications. This then allows a method of licensing the credential service 200 because a specific URL must be used for a specific credential service 200. The method of licensing a service thus includes a validation that the URL in the license is the same as the URL stored in the credential service that is being sent to mobile devices. If the software service 200 is deployed in a new location (i.e. a different server 14), a new or different URL would be required to reach the new location, but if the same license is used, then the software will not be licensed to run. In order to get a new or updated license, the business that provides the credential service software 200 will be contacted and the revenues and business arrangements can be created to pay for the legitimate use of the software and a license file can be provided that contains the new URL.

Initially, with reference to FIG. 3, a mobile app on a mobile phone 12 uses a URL to reach a credential service (step 102). The Internet is built upon the use of domain names and URL—universal resource locators. Upon initial installation of the mobile software, an initial URL would be entered along with any other appropriate information for accessing the credential service. The URL may even be hard coded in the application.

Next, the credential service 200 will process the incoming request from the phone (step 104). As part of processing the incoming request, the service will check that the license is valid (step 106). Part of the process of checking the license includes retrieving a copy of the URL or domain name that is used by the credential service on messages back to the mobile app (step 108).

After retrieving the copy of the URL or domain name, checking the license includes validating the license signature and its validity of lifespan (start/end dates) and comparing the copy of the URL or domain name with what is saved in the license (step 110). The license signature would validate that the information contained in the license has not been modified. If the URL or domain names match, then that part of the license is valid. The comparison could include a direct string comparison. Or, the URL could be encrypted or hashed into a resulting form that could be compared. Or, the checking to see if they match could include making a call to another service (not shown, but this other service may be hosted separately from server 14) that is separate from the credential service 200 and sending a copy of the URL and an identifier of the service 200 and receiving back an indication of whether the license is still valid or not. At any rate, the URL is compared against a licensed URL and ensured that they are the same.

After the license is deemed to be valid, the service 200 continues and prepares a response to the mobile device 12 with requested credentials, information, and so on (step 112). Alternatively, the process of retrieving the URL (step 108) and checking the URL (step 110) can be eliminated by simply using the URL that is in the license to prepare a response to the mobile device (step 112). The message is sent back to the mobile device, including in the message is the copy of the URL (step 114). The mobile device saves the information returned by the service and also saves the copy of the URL (step 116).

On subsequent calls to the credential service (step 102) the mobile app on the mobile device 12 uses the URL to reach the credential service 200. If the URL is correct, the mobile device 12 can reach the service 200. If it is not correct, the mobile device 12 will not be able to reach the service 200.

Utilization of a URL in the license provides great flexibility for deployment topology for the provider hosting the credential service while limiting the deployments to be useful only with certain URLs. Adding additional URLs would require additional licenses. The deployment flexibility includes the ability to provide additional servers for load balancing, scaling and redundancy. As long as the URL is the same, these deployment topologies are readily operable. Additionally, a URL can be redirected to a disaster recovery environment and in this way the same license can serve both for a primary deployment as well as a disaster recovery deployment.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of licensing software for a service comprising a server, the method comprising:
   downloading a licensed URL for subsequent transactions with the service;
   checking the licensed URL by validating, in the server, a license signature of a license for the software, wherein checking the licensed URL comprises validating a lifespan of the license;
   comparing, in the server, via a direct string comparison of the licensed URL with a URL encoded in the license with the service, such that if the comparing of the licensed URL with a URL encoded in the license results in a difference, then the software will not be licensed to run;
   sending the licensed URL to a mobile device from the service such that if the licensed URL is equivalent to the URL encoded in the license, the server provides credentials to the mobile device such that the mobile device can reach the service and the software will be licensed to run; and
   using the licensed URL to reach the service from the mobile device, wherein the software is credential service software for issuing the credentials for operating an access control.

2. The method as recited in claim 1, wherein validating a lifespan of the license includes validating a date.

3. The method as recited in claim 1, wherein the comparing includes encrypting the licensed URL into a resulting form that can be compared.

4. The method as recited in claim 1, wherein the comparing includes hashing the licensed URL into a resulting form that can be compared.

5. The method as recited in claim 1, further comprising saving the information returned by the service and saving the copy of the licensed URL.

6. The method as recited in claim 1, wherein if the software service is deployed in a new location, the licensed URL with the URL encoded in the license results in the difference.

7. The method as recited in claim 1, wherein if the software service is deployed in a different server, the licensed URL with the URL encoded in the license results in the difference.

8. The method as recited in claim 1, wherein the mobile device saves the information returned by the service and also saves the copy of the URL.

9. The method of claim 1, wherein the access control is a wireless-capable, restricted-access, or restricted-use device.

10. The method of claim 9, wherein the access control is selected from the group consisting of wireless locks, access control readers for building entry, electronic banking controls, data transfer devices, key dispenser devices and tool dispensing devices.

11. A method of licensing software for a service comprising a server, the method comprising:
    downloading a licensed URL for subsequent transactions with the service;
    checking the licensed URL by validating, in the server, a license signature of a license for the software, wherein checking the licensed URL comprises validating a lifespan of the license;
    comparing, in the server, via a direct string comparison of the licensed URL with a URL encoded in the license with the service, such that if the comparing of the licensed URL with a URL encoded in the license results in a difference, then the software will not be licensed to run, wherein if the software service is deployed in a new location, the licensed URL with the URL encoded in the license results in the difference;
    sending the licensed URL to a mobile device from the service such that if the licensed URL is equivalent to the URL encoded in the license, the server provides credentials to the mobile device such that mobile device can reach the service and the software will be licensed to run; and
    using the licensed URL to reach the service from the mobile device, wherein the software is credential service software for issuing the credentials for operating an access control.

12. The method as recited in claim 11, wherein the comparing includes encrypting the licensed URL into a resulting form that can be compared.

13. The method as recited in claim 11, wherein the comparing includes hashing the licensed URL into a resulting form that can be compared.

14. The method of claim 11, wherein the access control is a wireless-capable, restricted-access, or restricted-use device.

15. The method of claim 14, wherein the access control is selected from the group consisting of wireless locks, access control readers for building entry, electronic banking controls, data transfer devices, key dispenser devices and tool dispensing devices.

16. A method of licensing software for a service comprising a server, the method comprising:
    downloading a licensed URL for subsequent transactions with the service;
    checking the licensed URL by validating, in the server, a license signature of a license for the software, wherein checking the licensed URL comprises validating a lifespan of the license;
    comparing, in the server, via a direct string comparison of the licensed URL with a URL encoded in the license with the service, such that if the comparing of the licensed URL with a URL encoded in the license results in a difference, then the software will not be licensed to run, wherein if the software service is deployed in a different server, the licensed URL with the URL encoded in the license results in the difference;
    sending the licensed URL to a mobile device from the service such that if the licensed URL is equivalent to the URL encoded in the license, the server provides credentials to the mobile device such that the mobile device can reach the service and the software will be licensed to run; and
    using the licensed URL to reach the service from the mobile device, wherein the software is credential service software for issuing the credentials for operating an access control.

17. The method as recited in claim 16, wherein the comparing includes encrypting the licensed URL into a resulting form that can be compared.

18. The method as recited in claim 16, wherein the comparing includes hashing the licensed URL into a resulting form that can be compared.

19. The method of claim 16, wherein the access control is a wireless-capable, restricted-access, or restricted-use device.

20. The method of claim 19, wherein the access control is selected from the group consisting of wireless locks, access control readers for building entry, electronic banking controls, data transfer devices, key dispenser devices and tool dispensing devices.

\* \* \* \* \*